US008992213B2

(12) United States Patent
Moller et al.

(10) Patent No.: US 8,992,213 B2
(45) Date of Patent: Mar. 31, 2015

(54) SEALING MECHANISM FOR A VACUUM HEAT TREATING FURNACE

(75) Inventors: Craig Moller, Roscoe, IL (US); Werner Hendrik Grobler, Clyde Park, MT (US); Jake Hamid, Oakwood Hills, IL (US)

(73) Assignee: Ipsen, Inc., Cherry Valley, IL (US)

( * ) Notice: Subject to any disclaimer, the term of this patent is extended or adjusted under 35 U.S.C. 154(b) by 864 days.

(21) Appl. No.: 12/699,461

(22) Filed: Feb. 3, 2010

(65) Prior Publication Data

US 2010/0196836 A1 Aug. 5, 2010

Related U.S. Application Data

(60) Provisional application No. 61/149,507, filed on Feb. 3, 2009.

(51) Int. Cl.

| | |
|---|---|
| ***F27D 7/04*** | (2006.01) |
| ***F27D 7/06*** | (2006.01) |
| ***F27B 5/04*** | (2006.01) |
| ***F16J 15/00*** | (2006.01) |
| ***C21D 1/74*** | (2006.01) |
| ***C21D 1/767*** | (2006.01) |
| ***F27D 99/00*** | (2010.01) |
| *C21D 9/00* | (2006.01) |

(52) U.S. Cl.

CPC ................ *F27D 7/04* (2013.01); *C21D 9/0043* (2013.01); *F27B 5/04* (2013.01); *F27D 99/0073* (2013.01)

USPC .......... 432/244; 432/205; 432/115; 49/475.1; 49/303; 49/316; 49/477.1; 126/99 R; 220/526; 220/361; 277/432; 277/500; 277/409; 292/307 R; 384/130; 415/110; 415/111; 415/112

(58) Field of Classification Search

None

See application file for complete search history.

(56) References Cited

U.S. PATENT DOCUMENTS

| | | | | |
|---|---|---|---|---|
| 2,300,385 | A * | 10/1942 | Kollberg et al. | 277/377 |
| 2,363,420 | A * | 11/1944 | Howard | 417/423.3 |
| 2,526,175 | A * | 10/1950 | Van Alstyne et al. | 192/58.92 |
| 2,677,944 | A * | 5/1954 | Ruff | 62/192 |
| 2,857,182 | A * | 10/1958 | Bain et al. | 277/401 |
| 2,899,245 | A * | 8/1959 | Michel | 384/132 |
| 2,913,989 | A * | 11/1959 | Boardman et al. | 417/321 |

(Continued)

FOREIGN PATENT DOCUMENTS

| | | |
|---|---|---|
| EP | 2006582 | 5/2013 |

OTHER PUBLICATIONS

European Search Report, dated Sep. 24, 2009, of EP Application No. 09165563.9.

*Primary Examiner* — Gregory Huson
*Assistant Examiner* — Eric Gorman
(74) *Attorney, Agent, or Firm* — Dann Dorfman Herrell and Skillman, P.C.

(57) ABSTRACT

An apparatus for sealing a fan drive shaft in a vacuum heat treating furnace is disclosed. The sealing apparatus includes a housing having an annular body and a central opening. An inflatable first seal surrounds the central opening of the annular body. A second seal surrounds the central opening and is adjacent to the inflatable first seal. The sealing apparatus also includes a channel formed in the annular body adjacent to the second seal for conducting a purging fluid into the central opening. A means for injecting the purging fluid into the central opening is operably connected to the channel. A vacuum heat treating furnace and a fan drive system incorporating the sealing apparatus are also described.

16 Claims, 6 Drawing Sheets

(56) References Cited

U.S. PATENT DOCUMENTS

| | | | | | |
|---|---|---|---|---|---|
| 3,015,506 | A | * | 1/1962 | Tracy | 277/388 |
| 3,062,022 | A | * | 11/1962 | Averill et al. | 62/402 |
| 3,062,151 | A | * | 11/1962 | Eickmann | 418/173 |
| 3,554,661 | A | * | 1/1971 | Oglesby et al. | 415/112 |
| 3,746,350 | A | * | 7/1973 | Mayer et al. | 277/399 |
| 3,843,140 | A | * | 10/1974 | Mayer et al. | 277/408 |
| 3,968,969 | A | * | 7/1976 | Mayer et al. | 277/408 |
| 4,024,911 | A | * | 5/1977 | Forrest et al. | 376/203 |
| 4,166,610 | A | * | 9/1979 | Yamazaki et al. | 266/89 |
| 4,193,603 | A | * | 3/1980 | Sood | 277/304 |
| 4,201,342 | A | * | 5/1980 | Stram | 239/128 |
| 4,220,197 | A | * | 9/1980 | Schaefer et al. | 165/263 |
| 4,242,039 | A | * | 12/1980 | Villard et al. | 415/112 |
| 4,278,421 | A | * | 7/1981 | Limque et al. | 432/152 |
| 4,451,200 | A | * | 5/1984 | Libertini et al. | 415/110 |
| 4,573,808 | A | * | 3/1986 | Katayama | 384/114 |
| 4,606,712 | A | * | 8/1986 | Vondra | 418/88 |
| 4,629,196 | A | * | 12/1986 | Joniec | 277/366 |
| 4,734,018 | A | * | 3/1988 | Taniyama et al. | 417/423.4 |
| 4,764,086 | A | * | 8/1988 | Jesinger | 415/112 |
| 4,787,844 | A | * | 11/1988 | Hemsath | 432/242 |
| 4,818,222 | A | * | 4/1989 | Docherty et al. | 432/138 |
| 4,894,036 | A | * | 1/1990 | Switlik | 441/93 |
| 4,943,268 | A | * | 7/1990 | Eisenmann et al. | 475/95 |
| 4,970,372 | A | * | 11/1990 | Fleiter et al. | 219/400 |
| 5,119,395 | A | * | 6/1992 | Hemsath et al. | 373/112 |
| 5,154,517 | A | * | 10/1992 | Hodge | 384/470 |
| 5,256,061 | A | * | 10/1993 | Cress | 432/205 |
| 5,344,163 | A | * | 9/1994 | Roll et al. | 277/424 |
| 5,368,313 | A | * | 11/1994 | Hudson | 277/422 |
| 5,489,384 | A | * | 2/1996 | Janik et al. | 210/436 |
| 5,502,742 | A | * | 3/1996 | Kellogg et al. | 373/128 |
| 5,709,544 | A | * | 1/1998 | Wurtz | 432/242 |
| 5,827,042 | A | * | 10/1998 | Ramsay | 415/112 |
| 5,856,992 | A | * | 1/1999 | Karube et al. | 372/58 |
| 5,893,565 | A | * | 4/1999 | Hill et al. | 277/430 |
| 5,901,670 | A | * | 5/1999 | Moroi et al. | 122/26 |
| 6,073,857 | A | * | 6/2000 | Gordon et al. | 237/12.1 |
| 6,161,768 | A | * | 12/2000 | Gordon et al. | 237/12.1 |
| 6,283,749 | B1 | * | 9/2001 | Bernard et al. | 432/242 |
| 6,296,255 | B1 | * | 10/2001 | Hashimoto | 277/558 |
| 6,307,874 | B1 | * | 10/2001 | Moller | 373/109 |
| 6,446,976 | B1 | * | 9/2002 | Key et al. | 277/367 |
| 6,756,566 | B2 | * | 6/2004 | Moller | 219/400 |
| 7,021,907 | B2 | * | 4/2006 | Hobmeyr et al. | 417/368 |
| 7,047,908 | B2 | * | 5/2006 | Henderson | 122/395 |
| 7,090,223 | B2 | * | 8/2006 | Reinhard | 277/551 |
| 7,513,141 | B2 | * | 4/2009 | Rietzel | 73/46 |
| 7,607,884 | B2 | * | 10/2009 | Cohen | 415/121.1 |
| 8,042,813 | B2 | * | 10/2011 | Kung | 277/370 |
| 8,043,431 | B2 | * | 10/2011 | Ozaki et al. | 118/715 |
| 8,057,599 | B2 | * | 11/2011 | Ozaki et al. | 118/715 |
| 8,282,737 | B2 | * | 10/2012 | Ozaki et al. | 118/733 |
| 2002/0047242 | A1 | * | 4/2002 | Watanabe et al. | 277/553 |
| 2002/0095939 | A1 | * | 7/2002 | Gordon et al. | 60/784 |
| 2002/0140177 | A1 | * | 10/2002 | Murray | 277/500 |
| 2002/0153294 | A1 | * | 10/2002 | Leavesley et al. | 210/198.2 |
| 2002/0180159 | A1 | * | 12/2002 | Nakamura et al. | 277/500 |
| 2002/0195439 | A1 | * | 12/2002 | Moller | 219/400 |
| 2004/0007565 | A1 | * | 1/2004 | Moller | 219/400 |
| 2005/0045552 | A1 | * | 3/2005 | Tadlock | 210/440 |
| 2005/0110220 | A1 | * | 5/2005 | Murray | 277/500 |
| 2005/0134002 | A1 | * | 6/2005 | Elliott et al. | 277/371 |
| 2008/0031732 | A1 | * | 2/2008 | Peer et al. | 415/201 |
| 2008/0135501 | A1 | * | 6/2008 | Tadlock | 210/767 |
| 2009/0087299 | A1 | * | 4/2009 | Agrawal et al. | 415/1 |
| 2009/0186311 | A1 | * | 7/2009 | Katsumata | 432/24 |
| 2010/0253005 | A1 | * | 10/2010 | Liarakos et al. | 277/353 |
| 2011/0250067 | A1 | * | 10/2011 | Schlienger et al. | 415/230 |
| 2012/0107099 | A1 | * | 5/2012 | Jeong et al. | 415/122.1 |

* cited by examiner

SEALING MECHANISM FOR A VACUUM HEAT TREATING FURNACE

CROSS REFERENCE TO RELATED APPLICATION(S)

This application claims the benefit of U.S. Provisional Patent Application No. 61/149,507 filed Feb. 3, 2009, the entirety of which is incorporated herein by reference.

BACKGROUND OF THE INVENTION

1. Field of the Invention

This invention relates in general to vacuum heat treating furnaces, and in particular, to a sealing mechanism for a cooling fan drive shaft that penetrates the wall of a vacuum heat treating furnace.

2. Description of the Related Art

Many of the known vacuum heat treating furnaces have an internal gas quenching system. The gas quenching system includes an internal fan for circulating an inert cooling gas over the heated metal parts and through an internal heat exchanger. Commercially available embodiments of such furnaces also have an internally mounted electric motor for driving the gas circulation fan. An example of such a furnace is that sold under the registered trademark "TURBO TREATER" by Ipsen Inc., the assignee of the present application.

The interior of a vacuum heat treating furnace is subject to extreme temperature and pressure conditions. Depending on the type of material being heat treated, the interior of the furnace can reach a temperature of up to 3000° F. (1650° C.), be evacuated to a vacuum of down to about $10^{-5}$ torr, and be backfilled with inert gas up to a pressure of up to about 12 bar (1.2 MPa). Under such operating conditions, the useful life of most electric motors is severely curtailed resulting in costly maintenance, repair, or replacement, and furnace downtime. Although the construction of the electric motors used in the known vacuum heat treating furnaces has been modified in various ways to overcome the problems associated with the extreme conditions encountered in such furnaces, none of the modifications have proven entirely satisfactory. The design modifications that work best are also the most expensive to implement. Lower cost modifications have not provided a reliable solution to the problem.

A desirable alternative to locating the fan drive motor inside the furnace vessel is to locate the motor outside the furnace where it is not subject to the temperature and pressure extremes encountered inside the furnace vessel. However, in order to locate the fan drive motor outside the furnace vessel, it is necessary to provide a seal where the drive shaft penetrates the furnace wall. The problem is to effectively provide a vacuum-tight seal for a vacuum as low as about $10^{-5}$ torr, as well as to provide a gas-tight seal that is capable of sealing against a fluid pressure of up to 12 bar (1.2 MPa) or higher.

One solution to the foregoing problem is described in U.S. Pat. No. 5,709,544, the entire disclosure of which is incorporated herein by reference. The '544 patent describes a dual seal arrangement that includes an inflatable seal and a lip seal that surround the fan drive shaft where the shaft passes through the furnace wall. The inflatable seal provides a vacuum-tight seal around the drive shaft when inflated. The lip seal provides a gas-tight seal around the drive shaft when the vacuum furnace is pressurized with a cooling fluid and the fan is being rotated. The dual-seal described in the '544 patent has proved effective. However, the lip-type gas seal is a contacting seal and thus, is subject to wear when the drive shaft rotates in operation. In order to avoid premature wearing of the lip seal, some users have limited the rotational speed of the drive shaft. Although the shaft speed reduction benefits the service life of the lip seal, it adversely affects the cooling efficiency of the fan. Another drawback of the lip seal is that the higher the cooling gas pressure used, the greater the force on the lip seal against the drive shaft. The higher sealing force increases the wear rate of the lip seal. Therefore, it has also been necessary to limit the pressure of the cooling gas in order to avoid premature wearing of the lip seal. Although the use of reduced gas pressure benefits the service life of the lip seal, it adversely affects the efficiency of cooling a work load in the furnace.

In addition to the foregoing drawbacks, the dual seal described in the '544 patent includes numerous components which are installed and assembled in place. Maintenance of the seals required disassembling and then re-assembling the seals and the hardware that supports them in the vacuum furnace. Consequently, when it is necessary to perform maintenance on the seals, the furnace has to be shut down for an extended period of time. Extended shut-down periods are highly undesirable in production manufacturing facilities.

SUMMARY OF THE INVENTION

In accordance with one aspect of the present invention, there is provided a vacuum heat treating furnace that includes a pressure vessel having a wall that defines a chamber, a fan disposed inside the chamber for circulating a cooling gas therein, a motor disposed externally to the pressure vessel, and a drive shaft operatively connected to the fan and the motor through an opening in the wall of the pressure vessel. The vacuum furnace of the present invention further includes a dual seal mechanism disposed around the drive shaft adjacent the opening in the pressure vessel wall. The dual seal mechanism includes an inflatable first seal surrounding the drive shaft for providing a vacuum-tight seal around said drive shaft when inflated. The dual seal mechanism also includes a second seal surrounding the drive shaft adjacent to the inflatable first seal. The second seal has an inside diameter that is dimensioned such that a gap is present between the second seal and the drive shaft. The dual seal mechanism further includes a channel disposed adjacent to the second seal for conducting a purging fluid to the gap between the drive shaft and the second seal. A means for injecting the purging fluid into the gap is operably connected to the channel.

In accordance with a second aspect of the present invention, there is provided an apparatus for sealing a fan drive shaft in a heat treating furnace. The sealing apparatus includes a housing having an annular body and a central opening. An inflatable first seal surrounds the central opening of the annular body. A second seal surrounds the central opening and is adjacent to the inflatable first seal. The sealing apparatus also includes a channel formed in the annular body adjacent to the second seal for conducting a purging fluid into the central opening.

In accordance with a further aspect of the present invention, there is provided a fan drive system for a vacuum heat treating furnace. The fan drive system according to this aspect of the invention includes an electric motor adapted to be disposed externally to the vacuum heat treating furnace and a drive shaft adapted to be connected to a fan inside the vacuum furnace and to the motor through an opening in the wall of vacuum furnace. The fan drive system also includes a dual seal mechanism disposed around the drive shaft adjacent to an opening in the pressure vessel wall. The dual seal mechanism includes an inflatable first seal surrounding the drive shaft for providing a vacuum-tight seal around the drive shaft when inflated. The dual seal mechanism also includes a second seal surrounding the drive shaft adjacent to the inflatable first seal. The second seal has an inside diameter that is dimensioned such that a gap is present between the second seal and the drive shaft. The dual seal mechanism further includes a channel disposed adjacent to the second seal for conducting a purging fluid between the drive shaft and the second seal and means connected to the channel for injecting the purging fluid.

BRIEF DESCRIPTION OF THE DRAWINGS

The following description of a preferred embodiment of the present invention will be better understood when read with reference to the accompanying drawings, of which.

DETAILED DESCRIPTION

Figure 1:
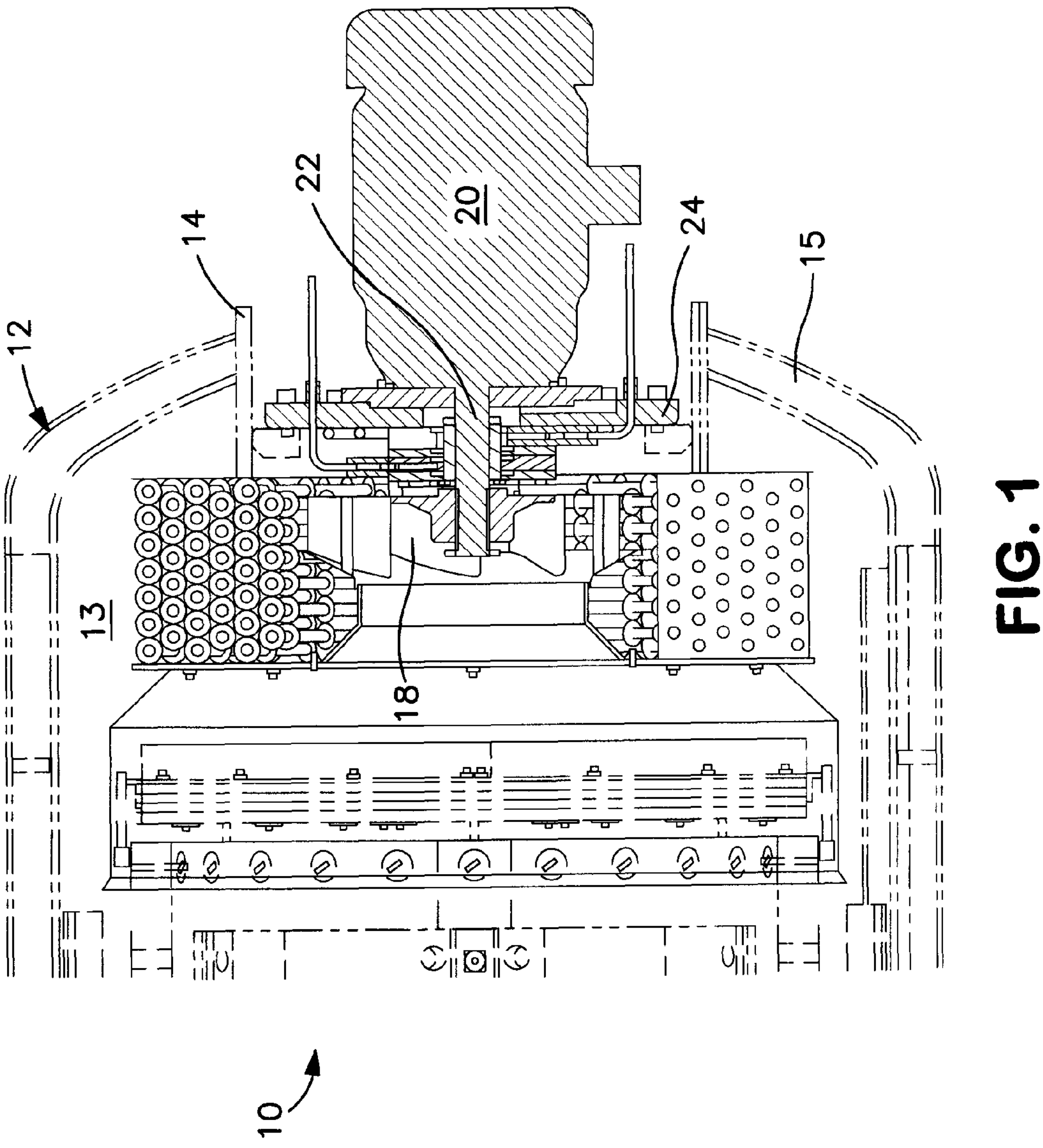
FIG. 1 is a partial side elevation view in partial section of a vacuum heat treating furnace in accordance with the present invention.
Figure 2:
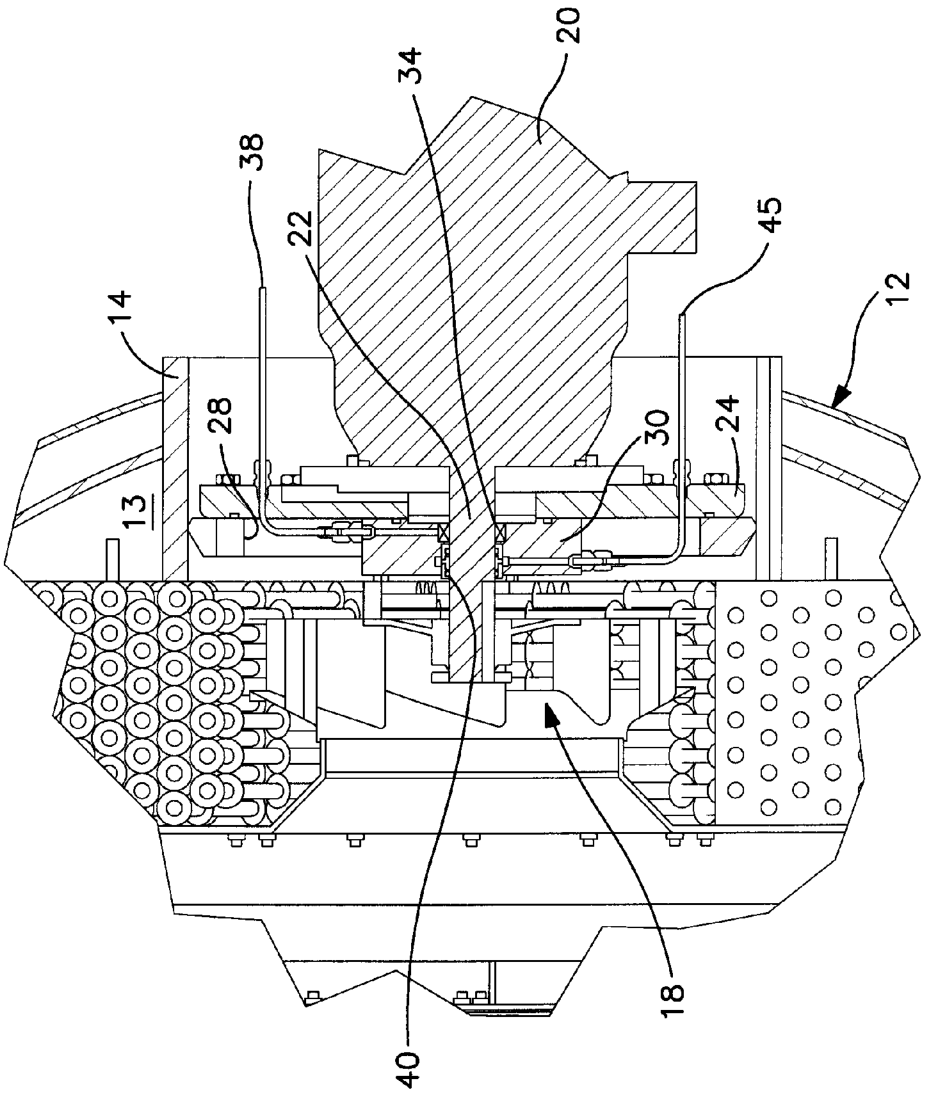
FIG. 2 is a detail elevation view in partial section of a dual seal arrangement used in a fan drive system in the vacuum heat treating furnace shown in FIG. 1.

Referring now to the drawings, and in particular to FIGS. 1 and 2, there is shown a vacuum heat treating furnace 10 in accordance with the present invention. The vacuum heat treating furnace 10 includes a pressure vessel 12 which encloses a chamber 13 wherein metal parts are heat treated. Pressure vessel 12 has a receptacle 14 formed through pressure vessel end wall 15. The receptacle 14 is generally cylindrical in shape.

A forced gas cooling system is provided in the vacuum furnace 10 for directing a cooling gas over metallic work pieces after they are heat treated in the furnace. The cooling gas is an inert gas such as nitrogen, argon, helium, hydrogen or a mixture of at least two of those gases. The gas cooling system includes a gas circulating fan 18 and a fan drive motor 20 which is connected to the fan 18 by a drive shaft 22. A heat exchanger is positioned in the chamber 13 to remove heat from the cooling gas as it is circulated by the fan. The fan drive motor 20 is mounted and supported outside the pressure vessel 12. In a vacuum heat treating furnace that operates at very high temperatures, e.g., 2000-3000° F. (1093-1650° C.), the fan dirve motor 20 is preferably mounted at a distance from the pressure vessel 12. In such an embodiment the fan drive motor 20 is coupled to the drive shaft 22 by means of a mechanical linkage such as a drive belt and sheave arrangement, a chain and sprocket arrangement, or a gear drive arrangement.

Figure 3:
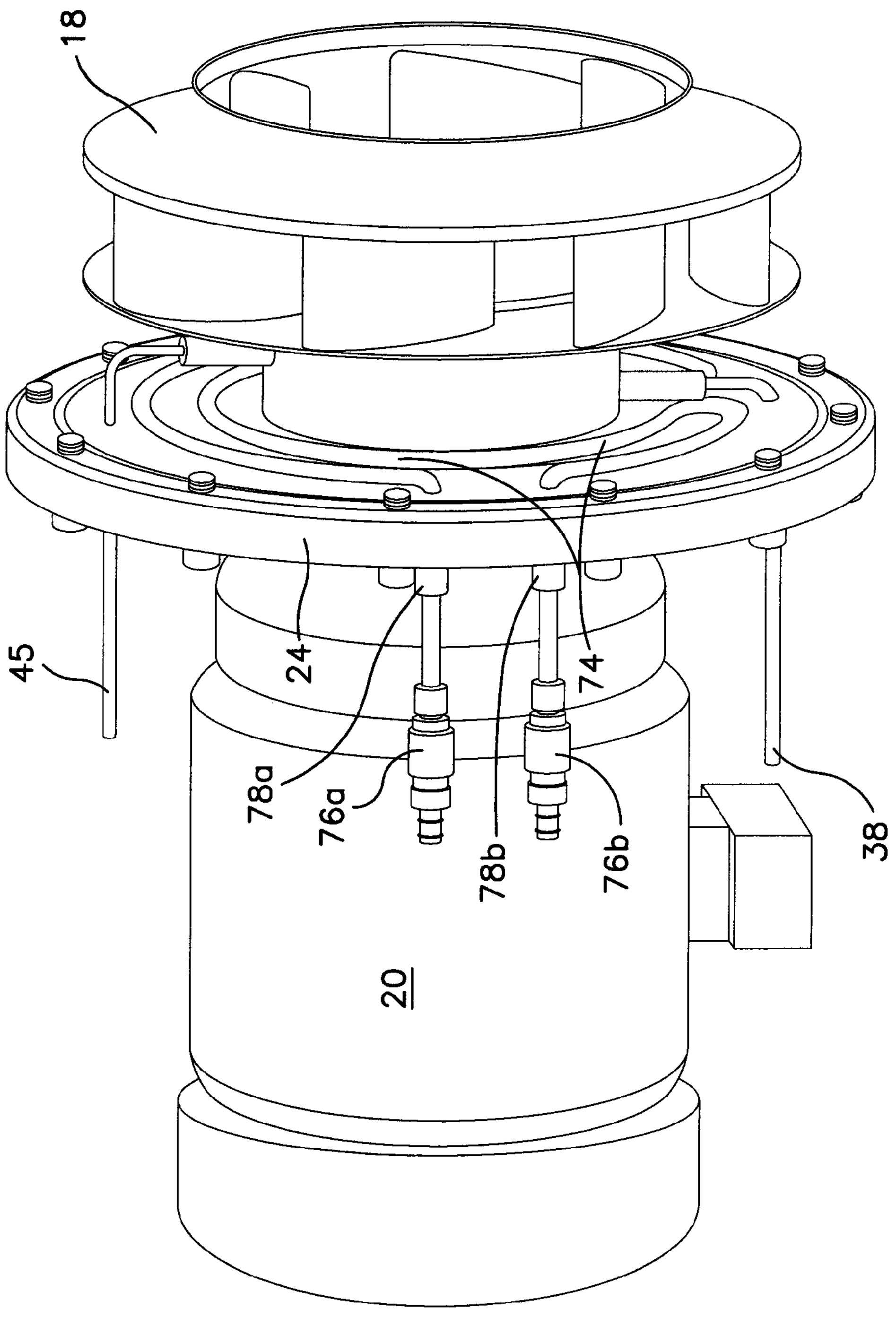
FIG. 3 is a side perspective view of the fan drive system shown in FIG. 2.
Figure 4:
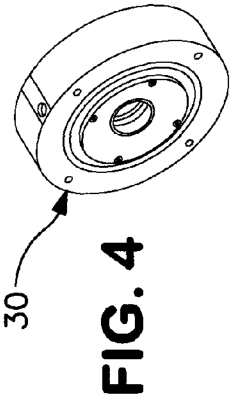
FIG. 4 is a front perspective view of a seal cartridge in accordance with the present invention.
Figure 7:
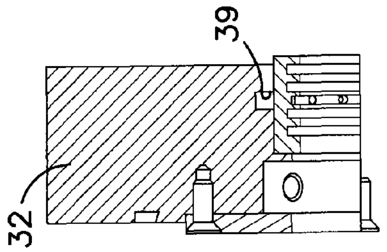
FIG. 7 is a second side elevation view in partial section of the seal cartridge of FIG. 4 as viewed along line C-C of FIG. 5.

A support plate 24 is disposed within the receptacle 14 to provide a wall or bulkhead between chamber 13 and the ambient environment outside pressure vessel 12. Fan drive motor 20 is attached to the support plate 24 by any suitable means. The support plate 24 has an opening 28 through which the drive shaft 22 extends. A dual seal mechanism 30 is disposed in opening 28 where it is affixed to and supported by the support plate 24 around the drive shaft 22 to provide a vacuum-tight seal and a substantially gas-tight seal. As shown in FIG. 3 a coil of metal tubing 74 is wrapped around the dual seal mechanism 30 on the inboard side of the support plate 24 for conducting a cooling medium such as water. The metal tubing 74 penetrates the support plate 24 through to the outboard side thereof. Vacuum seals **78*a* and 78*b* are provided around the metal tubing 74 where the tubing penetrates through the support plate 24 to provide substantially vacuum-tight seals around the tubing. Connectors 76*a*, 76*b* are affixed to the tubing ends for connection to a source of the coolant. It will be appreciated by those skilled in the art that arrangements of cooling coils other than that shown in FIG. 3** can be utilized.

Referring now to FIGS. 4 to 7, the dual seal mechanism 30 is illustrated in greater detail. The dual seal mechanism is preferably constructed as a cartridge containing an inflatable seal and a non-contacting seal. A housing 32 that is attached to support plate 24 by suitable fasteners, has a central opening. A first circumferential recess 36 is formed in housing 32 around the central opening. The recess 36 is dimensioned for receiving an inflatable seal 34. The inflatable seal 34 is a generally ring-shaped tube preferably formed of fabric reinforced silicone or another gas-impermeable, flexible material which can be inflated. The tube can have any suitable cross section, but is preferably rectangular or oval in cross section. The cross section of the inflatable seal 34 is dimensioned to fit within recess 36 and be clear of the drive shaft 22 when the inflatable seal is deflated. When the inflatable seal 34 is inflated, it expands beyond the limits of recess 36 to press on the circumference of the drive shaft 22 to form a vacuum-tight seal between the drive shaft and the housing 32. A radial channel 37 is formed in the housing 32 to provide a communication port between the inflatable seal 34 and a source of pressurized gas or other fluid for inflating the inflatable seal 34. A gas-tight tube 38 (shown in FIGS. 2 and 3) is connected to the radial channel 37 and extends through the support plate 24 to the pressurized gas source. The gas-tight tube 38 also permits the inflatable seal 34 to be connected to a vacuum, if desired, so that it can be deflated sufficiently to be clear of the drive shaft. A suitable type of inflatable seal is one sold under the registered trademark "PNEUMA-SEAL" by the Engineered Products Division of Pawling Corporation, Pawling, N.Y. If desired, a thermal heat shield can be installed over the gas-tight tube 38 on the inboard side of support plate 24.

The dual seal mechanism 30 has a non-contacting seal 40 adjacent to the inflatable seal 34. The non-contacting seal provides a controlled clearance or gap around the drive shaft 22. The controlled gap is dimensioned so that the shaft can rotate substantially freely at any angular velocity and with any furnace pressure without causing significant wear of the seal material. There is a small amount of gas leakage from the furnace chamber through the gap to the atmosphere. However, the gas leakage rate is held to an acceptable level by proper selection of the gap distance which is preferably about 0.002-0.005 inch (0.05-0.125 mm). In a preferred embodiment, a packing material that can "wear in" is included around the shaft to narrow or eliminate the gap. The packing material is applied between the shaft surface and the seal cartridge body to provide a smaller gap after some of the packing material is worn away. Preferred materials for such a design include graphite rope packing, GRAPHFOIL rings, TEFLON rings, ceramic fiber rings, or other suitable material.

Figure 6:
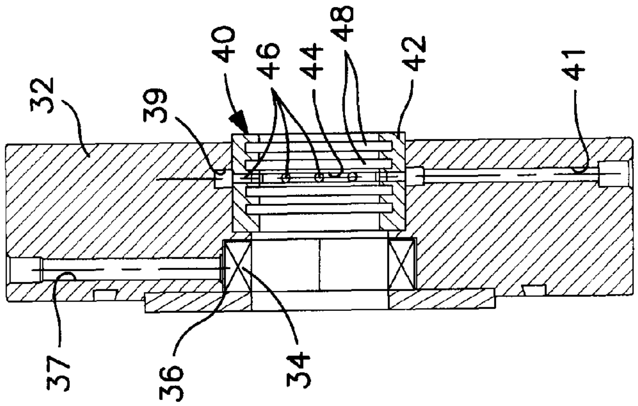
FIG. 6 is a side elevation view in partial section of the seal cartridge of FIG. 4 as viewed along line A-A of FIG. 5.
Figure 5:
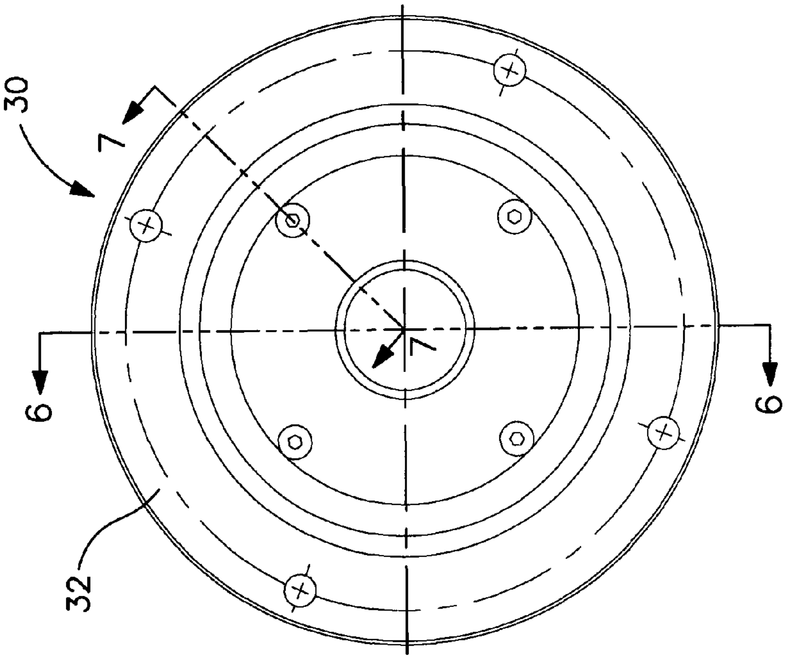
FIG. 5 is a front elevation view of the seal cartridge shown in FIG. 4.

As shown in FIG. 6, the non-contacting seal 40 includes a bushing 42. The bushing 42 is press fit into a second recess in the housing 32 adjacent to recess 36. The bushing 42 is preferably formed of material that is generally softer than the drive shaft 22. In a preferred embodiment the bushing 42 is machined from graphite-metal alloy. A commercial form of such a material is sold under the registered trademark GRAPHALLOY. The bushing 42 has a circumferential groove 44 formed around the internal circumference. A plurality of small bore holes 46 are formed in the bushing 42 between the outer surface and terminating in the circumferential groove 44. The circumferential groove 44 and bore holes 46 are situated on the bushing 42 such they align with a channel 39 that is formed around the inside circumference of the housing 32. A second radial channel 41 is formed in the housing 32 to provide a communication port between the channel 39 and the purging gas supply tube 45. With this arrangement, a purging gas can be injected into the gap between bushing 42 and the drive shaft 22 to prevent outside air from being drawn into the furnace chamber when the furnace is transitioned from a subatmospheric pressure to a superatmospheric pressure.

In an alternative embodiment, the bushing 42 is made from bronze, another metal, or a metal alloy suitable for use as a bushing material. In the alternative embodiment which is shown in FIG. 6, a plurality of additional grooves 48 are formed around the inside circumference of the bushing. The grooves 48 are preferably filled with a packing material such as the graphite rope packing described above.

Figure 8:
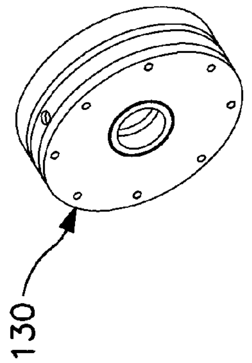
FIG. 8 is front perspective view of a second embodiment of a seal cartridge in accordance with the present invention.
Figure 10:
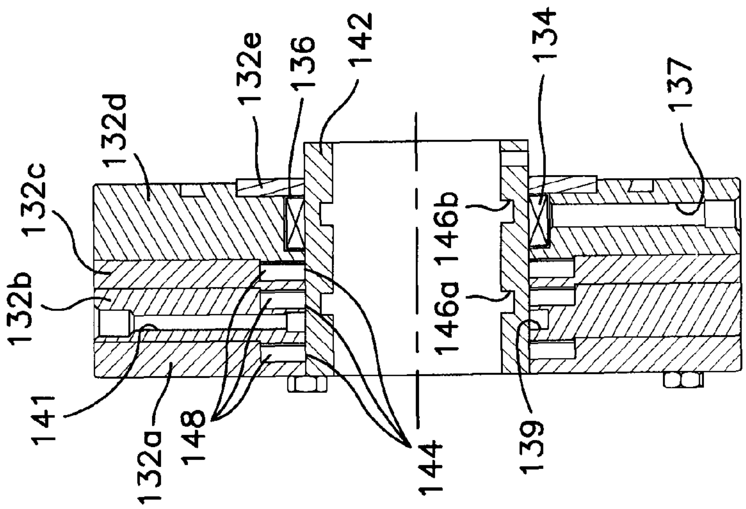
FIG. 10 is a side elevation view in partial section of the seal cartridge of FIG. 8 as viewed along line A-A of FIG. 9.
Figure 9:
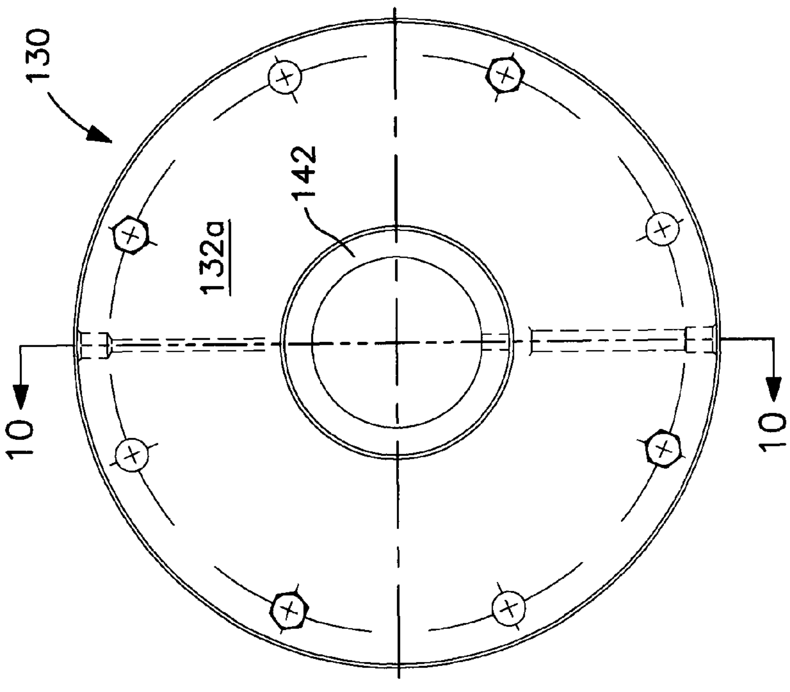
FIG. 9 is a front elevation view of the seal cartridge shown in FIG. 8.

A further embodiment of a seal cartridge in accordance with the invention is shown in FIGS. 8 to 10. A seal cartridge 130 includes a housing that is formed from a plurality of rings 132*a*, 132*b*, 132*c*, 132*d*, and 132*e*. A recess 136 is formed around the inside circumference of ring 132*d*. An inflatable seal 134, as described above, is positioned in the recess 136. A first radial channel 137 is formed in ring 132*d* to permit the inflatable seal to be connected to the gas-tight tube 38 for inflating and deflating the inflatable seal 134. A second recess or groove 139 is formed around the inside circumference of ring 132*b* at a location that is displaced longitudinally from the recess 136. A second radial channel 141 is formed in ring 132*b* to provide a communication port between the channel groove 139 and the purging gas supply tube 45. With this arrangement, a purging gas can be injected into the gap between the seal 130 and a sleeve 142 that is attached to the fan drive shaft. Additional grooves 148 are formed around the inside surfaces of rings 132*a*, 132*b*, and 132*c*. Sealing rings 144 are positioned in each of grooves to provide sealing. The sealing rings are preferably made of carbon graphite.

The sleeve 142 is fitted over the portion of the drive shaft 22 disposed within the seal cartridge 130. The sleeve 142 has a set screw hole formed therein to permit a setscrew (not shown) to couple the sleeve 142 onto drive shaft 22 whereby sleeve 142 is caused to rotate with drive shaft 22. First and second grooves 146*a* and 146*b* are formed in the inside surface of sleeve 142 to permit sealing rings (not shown) to be inserted between the sleeve 142 and drive shaft 22. The sleeve 142 has a very hard outer surface which is highly finished, preferably to about 8 RMS. The outer surface of sleeve 142 is preferably hardened with a thin coating of a material such as hard chromium plating or chromium III oxide ($Cr_2O_3$), to provide a very hard surface on the sleeve. The coating is preferably applied by electrodeposition or by a thermal spray deposition technique such as plasma spraying. The combination of hardness and smoothness of the sleeve surface provides an excellent contact surface for the inflatable seal 34 and the seal rings 144. The hard smooth surface of sleeve 142 also provides very good wear resistance for long life. It will be appreciated that the sealing surface sleeve 142 is easily replaceable and prevents scoring and wearing of the drive shaft 22 itself.

Figure 11:
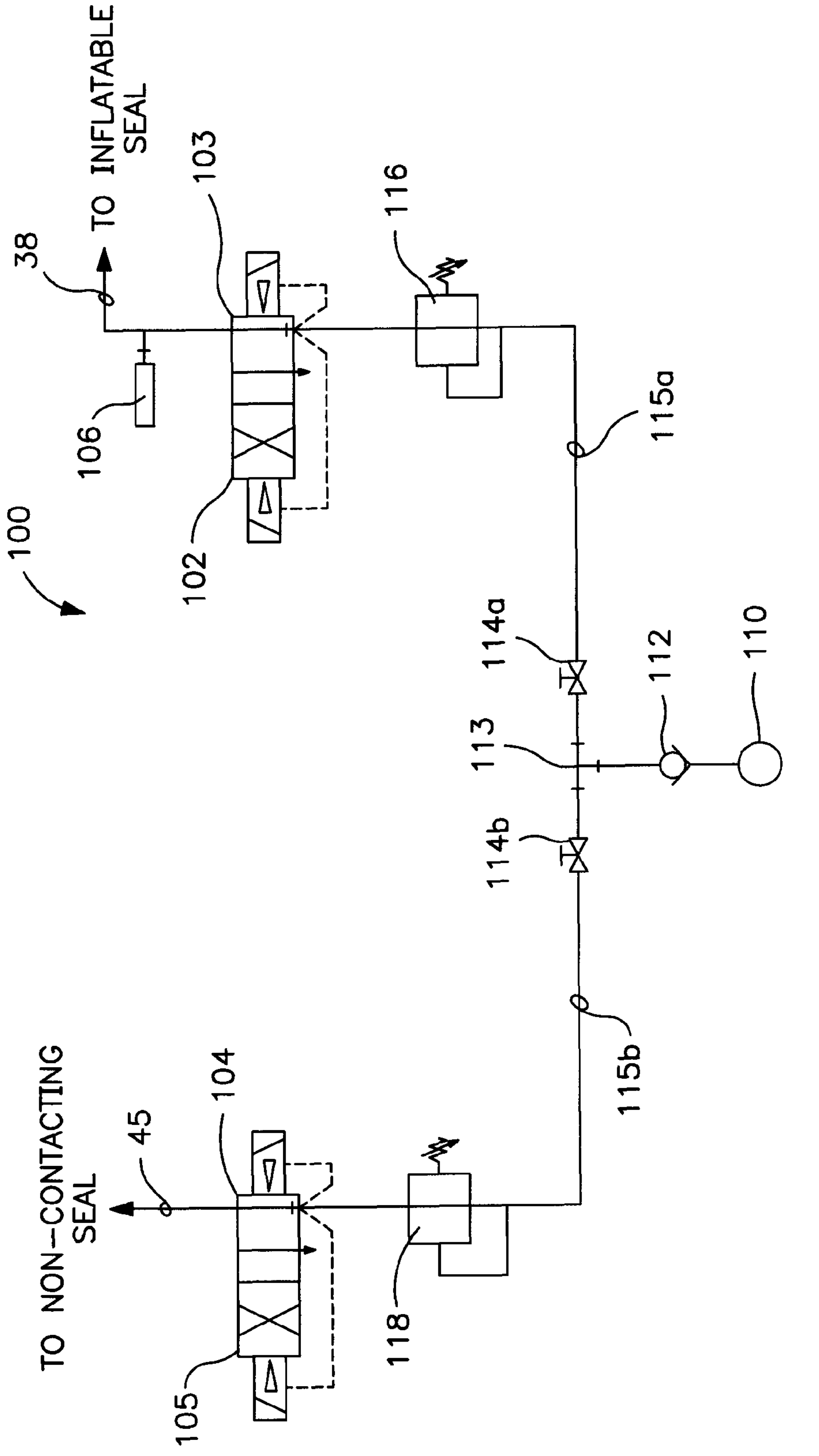
FIG. 11 is a schematic diagram of a pneumatic system for use with the dual seal arrangement according to the present invention.

Referring now to FIG. 11 there is shown a gas subsystem 100 for inflating and deflating the inflatable seal 34 and providing a purging gas to the non-contacting seal 40. The subsystem 100 includes a source 110 of pressurized gas. The pressurized gas is preferably an inert gas such as nitrogen, argon, helium, or a combination thereof. A check valve 112 is connected to the outlet of the pressure source 110. The outlet side of check valve 112 is connected to a T-connector 113 to bifurcate the gas supply line. All of the gas supply lines described herein are preferably formed of metal tubing using appropriate gas-tight fittings and connectors. Manual shut-off valve 114*a* is disposed in gas supply line 115*a* to the inflatable seal and a second shut-off valve 114*b* is disposed in the gas supply line 115*b* to the non-contacting seal. A pressure regulator 116 is connected in the supply line 115*a* downstream from the shut-off valve 114*a* for controlling the pressure in the supply to a preset value. A first solenoid valve 102 and a second solenoid valve 103 are connected to the supply line 115*a* and to the gas-tight 38 to the inflatable seal, downstream from the pressure regulator 116. The gas-tight tub 38 connects to the inflatable seal from the outlets of the first and second solenoid valves 102, 103. A pressure switch 106 is tapped into the gas supply line between the solenoid valves 102, 103 and the inflatable seal.

A second pressure regulator 118 is connected in the other gas supply line 115*b* downstream from the shut-off valve 114*b*. A third solenoid valve 104 and a fourth solenoid valve 105 are connected to the supply line 115*b* and to the supply line 45 to the non-contacting seal, downstream from the pressure regulator 118. The supply line 45 connects to the seal cartridge from the outlets of the third and fourth solenoid valves 104, 105.

The operation of a vacuum heat treating furnace in accordance with the present invention will now be described. When a work load of metallic parts has been loaded into the chamber of the vacuum furnace, the pressure vessel is closed and sealed. A typical heat treating cycle includes evacuating the furnace chamber to a desired subatmospheric pressure while heating the work load up to the heat treating temperature, maintaining the work load at the heat treating temperature for a selected amount of time, and then shutting off the heating system. The inflatable seal is deflated and then the cooling fan drive motor is started and brought up to full speed. The furnace chamber is then backfilled (pressurized) with the inert cooling gas. In an alternative operating sequence, the furnace chamber is pressurized with the cooling gas and when the pressure in the chamber reaches a preselected superatmospheric pressure, the fan motor is activated to drive the circulating fan to circulate the inert gas over the work load and through the heat exchanger. When a slower cooling rate is desired, the furnace chamber can be backfilled with a partial subatmospheric pressure of the inert gas.

The fan does not operate during the heating/evacuation step and the drive shaft is thus in a static condition during that period of the heat treating cycle. The pressure set point on pressure switch 106 is preferably reached within about 3 seconds after solenoid valve 103 is opened in order to start and/or continue a cycle requiring a vacuum. Once the cycle reaches the state where the inflatable seal is deflated, i.e., solenoid valve 103 is closed and solenoid valve 102 is opened, the signal from pressure switch 106 is thereafter ignored by the system.

If the pressure switch 106 set point is not reached within the preferred time interval after solenoid valve 103 is opened, or any time thereafter while solenoid valve 103 is opened, then an alarm sounds, the heating/evacuation cycle is aborted, and solenoid valve 104 is opened to inject purge gas into the gap between the non-contacting seal and the drive shaft. The purge gas is injected into the gap at a pressure that is sufficient to prevent ambient air from being drawn into the furnace.

When electrical power is turned on to the furnace after a shut down, solenoid valves 102, 103, 104, and 105 remain in the states they were in just prior to the power being turned off. There are two possible start-up conditions. Either the inflatable seal is inflated and no purge gas is being injected or the inflatable seal is deflated and the purge gas is being supplied to the non-contacting seal gap. A preselected time after the power to the vacuum furnace is turned on, preferably about 5 minutes, solenoid valve 103 is opened and solenoid valve 105 is closed, thereby causing the inflatable seal to be inflated and the purge gas to be stopped. The delay period allows any residual motor/fan rotation to stop completely before the inflatable seal is inflated.

At the start of the heating cycle, there is a preset delay period, preferably about 5 minutes, as described above for the powering up of the furnace. When a heat treating cycle is initiated, solenoid valve 103 and solenoid valve 105 remain in their initial positions while the furnace vacuum pump evacuates the furnace chamber. The solenoid valves remain in that state until the forced cooling portion of the heat treating cycle is initiated.

When the forced cooling cycle is initiated, solenoid valves 103 and 105 are de-energized causing them to close. Simultaneously, solenoid valves 102 and 104 are opened. Preferably, the opening of solenoid valve 102 is delayed for a preselected time, preferably about 3 seconds, after the time when solenoid valve 104 is opened in order to prevent air from being drawn into the furnace. When solenoid valves 102 and 104 are in their open (energized) positions, the inflatable seal is deflated and purge gas flows into the non-contacting seal gap.

There is a further time delay of preferably about 5 seconds after solenoid 102 opens until the cooling motor starts to provide sufficient time for the inflatable seal to deflate and retract from the drive shaft or sleeve surface. As described above, the cooling fan drive motor is preferably turned on and up to full speed before the furnace chamber is backfilled with the cooling gas.

When the cooling cycle is completed and stopped, solenoid valves 102 and 103 remain open to keep the inflatable seal deflated and to continue the gas purge in the non-contacting seal gap. The delay period is preferably about 5 minutes. After the delay period has elapsed, solenoid valves 103 and 105 are energized again to inflate the inflatable seal and stop the gas purge. This delay allows the fan motor to stop rotating completely before the inflatable seal is inflated. For any other cooling functions (vacuum cool, static cool), solenoid valves 103 and 105 remain open so that the inflatable seal is inflated and no purge gas is injected into the non-contacting seal gap.

In view of the foregoing description, some of the advantages of the dual seal according to the present invention should now be apparent. For example, the dual seal according to this invention is assembled in a compact cartridge that can be readily replaced when either of the seals fails or wears out. In addition, a dual seal is provided having a second seal that is designed to be substantially non-contacting with the fan drive shaft in order to minimize wear on the seal. A very small gap is provided between the seal and the drive shaft. This gap is dimensioned to minimize gas leakage from the furnace chamber when the furnace is pressurized with a cooling gas. Further still, the dual seal arrangement according to the invention includes means for providing a purging gas in the gap between the second seal and the drive shaft so that outside air is not drawn into the furnace chamber when the furnace is being transitioned from a subatmospheric pressure to a superatmospheric pressure.

What is claimed is:

1. An apparatus configured as a cartridge for sealing a fan drive shaft in a heat treating furnace, comprising:

(a) an annular housing having the following features:

an inside circumference that defines a central opening along the length of said annular housing, a first circumferential channel that extends around said inside circumference, a first radially directed channel extending from the first circumferential channel to an outer circumference of the annular housing, a second circumferential channel that extends around said inside circumference, a second radially directed channel extending from the second circumferential channel to the outer circumference of the annular housing, and a third circumferential channel that extends around said inside circumference and is axially spaced from the second circumferential channel on one side thereof, (b) an inflatable first seal positioned in the first circumferential channel and the first radially directed channel and surrounding the central opening of said annular housing;

(c) a sleeve positioned in the central opening concentrically with said annular housing;

(d) a first ring positioned inside the third circumferential channel and surrounding said sleeve;

said sleeve having:

an inside diameter dimensioned to fit around a fan drive shaft, and an outside diameter dimensioned to provide a space between said sleeve and the inside circumference of said annular housing such that said sleeve can rotate freely;

wherein said first ring has an inside diameter dimensioned to provide a gap between the ring and the sleeve and wherein the gap is dimensioned to permit gas to flow therethrough.

2. The sealing apparatus as claimed in claim 1 comprising:

a fourth circumferential channel formed around the inside circumference of said annular housing in axially spaced relation to the second circumferential channel on a second side thereof opposite said one side;

a second ring positioned in said fourth circumferential channel and surrounding the sleeve;

wherein said second ring has an inside diameter dimensioned to provide a gap between said second ring and said sleeve and wherein the gap is dimensioned to permit gas to flow therethrough.

3. The sealing apparatus as claimed in claim 2 comprising:

a fifth circumferential channel formed around the inside circumference of said annular housing in axially spaced relation to and between said third and fourth circumferential channels; and a third ring positioned in said fifth circumferential channel and surrounding the sleeve;

wherein said third ring has an inside diameter dimensioned to provide a gap between said third ring and said sleeve and wherein the gap is dimensioned to permit gas to flow therethrough.

4. The sealing apparatus as claimed in claim 1 wherein said ring is formed of a material selected from the group consisting of carbon graphite, polytetrafluoroethylene (TEFLON), and ceramic fiber.

5. A vacuum heat treating furnace comprising:

a pressure vessel having a wall that defines a chamber;

a fan disposed inside said chamber for circulating a cooling gas therein;

a motor disposed externally to said pressure vessel;

a fan drive shaft operatively connected to said fan and to said motor through an opening in the wall of said pressure vessel;

the sealing apparatus as claimed in claim 1 wherein said sealing apparatus is disposed around said fan drive shaft adjacent the opening in the pressure vessel; and a source of purging gas connected to said second radially directed channel such that the purging gas can be injected into said second circumferential channel.

6. The vacuum heat treating furnace as claimed in claim 5 wherein the sealing apparatus comprises:

a fourth circumferential channel formed around the inside circumference of said annular housing in axially spaced relation to the second circumferential channel at a second side thereof opposite said one side;

a second ring positioned in said fourth circumferential channel and surrounding the sleeve;

wherein said second ring has an inside diameter dimensioned to provide a second gap between said second ring and said sleeve and wherein the second gap is dimensioned to permit gas to flow therethrough.

7. The vacuum heat treating furnace as claimed in claim 6 wherein the sealing apparatus comprises:

a fifth circumferential channel formed around the inside circumference of said annular housing in axially spaced relation to and between said third and fourth circumferential channels; and a third ring positioned in said fifth circumferential channel and surrounding the sleeve;

wherein said third ring has an inside diameter dimensioned to provide a third gap between said third ring and said sleeve and wherein the third gap is dimensioned to permit gas to flow therethrough.

8. The vacuum heat treating furnace as claimed in claim 5 wherein the first ring is formed of a material selected from the group consisting of carbon graphite, polytetrafluoroethylene (TEFLON), and ceramic fiber.

9. The vacuum heat treating furnace as claimed in claim 5 wherein the source of the purging gas comprises:

a pressurized source of an inert gas;

a first valve;

a first supply line connected between said pressurized gas source and said first valve; and a second supply line connected between said first valve and said second radially directed channel.

10. In a vacuum heat treating furnace having a pressure vessel that includes a wall defining a chamber and a fan disposed inside said chamber for circulating a cooling gas therein, a fan drive system comprising:

an electric motor disposed externally to said pressure vessel;

a fan drive shaft operatively connected to said fan and to said motor through an opening in the wall of said pressure vessel; and the sealing apparatus as claimed in claim 1 wherein said sealing apparatus is disposed around said fan drive shaft; and a source of purging gas connected to said second radially directed channel such that the purging gas can be injected into said second circumferential channel.

11. The vacuum heat treating furnace as claimed in claim 10 wherein the sealing apparatus comprises:

a fourth circumferential channel formed around the inside circumference of said annular housing in axially spaced relation to the second circumferential channel on a second side thereof opposite said one side;

a second ring positioned in said fourth circumferential channel and surrounding the sleeve;

wherein said second ring has an inside diameter dimensioned to provide a second gap between said second ring and said sleeve and wherein the second gap is dimensioned to permit gas to flow therethrough.

12. The vacuum heat treating furnace as claimed in claim 11 wherein the sealing apparatus further comprises:

a fifth circumferential channel formed around the inside circumference of said annular housing in axially spaced relation to and between said third and fourth circumferential channels; and a third ring positioned in said fifth circumferential channel and surrounding the central opening of said annular housing;

wherein said third ring has an inside diameter dimensioned to provide a third gap between said third ring and said sleeve and wherein the third gap is dimensioned to permit gas to flow therethrough.

13. An apparatus configured as a cartridge for sealing a fan drive shaft in a heat treating furnace, comprising:

(a) an annular housing having a central opening therethrough;

a first circumferential channel around an inside circumference of said annular housing, a radially directed channel extending from the first circumferential channel to an outside circumference of the annular housing, a second circumferential channel around the inside circumference of said annular housing in axially spaced relation to the first circumferential channel, and a second radially directed channel extending from the second circumferential channel to the outside circumference of the annular housing;

(b) an inflatable first seal disposed in the first circumferential channel and the radially directed channel and surrounding the central opening of said annular housing;

(c) a non-contacting seal disposed concentrically in the central opening in engagement with said annular housing and concentrically with the second circumferential channel, said non-contacting seal comprising:

a bushing positioned in the central opening;

a first circumferential groove around the inside circumference of said bushing such that said first circumferential groove is concentrically aligned with the second circumferential channel;

a plurality of boreholes in the wall of said bushing, said boreholes being radially directed so as to connect said first circumferential groove with the second circumferential channel; and a second circumferential groove around the inside circumference of the bushing in axially spaced relation to said first circumferential groove;

wherein said bushing has an inside diameter dimensioned to provide a gap between the bushing and a fan drive shaft inserted through the bushing and wherein the gap is dimensioned to permit gas to flow through the gap.

14. The sealing apparatus as claimed in claim 13 wherein the bushing comprises a third circumferential groove around the inside circumference of the bushing in axially spaced relation to said first circumferential groove and said second circumferential groove.

15. The sealing apparatus as claimed in claim 14 wherein the bushing comprises fourth and fifth circumferential grooves around the inside circumference of the bushing in axially spaced relation to said first, second, and third circumferential grooves.

16. A vacuum heat treating furnace comprising:

a pressure vessel having a wall that defines a chamber;

a fan disposed inside said chamber for circulating a cooling gas therein;

a motor disposed externally to said pressure vessel;

a fan drive shaft operatively connected to said fan and to said motor through an opening in the wall of said pressure vessel;

the sealing apparatus as claimed in claim 13; and a source of purging gas connected to said second radially directed channel such that the purging gas can be injected into said second circumferential channel, wherein the fan drive shaft is positioned in the central opening of said bushing.

* * * * *